(12) United States Patent
Sturman

(10) Patent No.: US 7,958,909 B2
(45) Date of Patent: Jun. 14, 2011

(54) SPOOL VALVE

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 0 days.

(21) Appl. No.: 12/764,783

(22) Filed: Apr. 21, 2010

(65) Prior Publication Data
US 2010/0200090 A1 Aug. 12, 2010

Related U.S. Application Data

(63) Continuation of application No. 11/703,303, filed on Feb. 6, 2007, now Pat. No. 7,775,240.

(60) Provisional application No. 60/771,112, filed on Feb. 7, 2006.

(51) Int. Cl.
*F15B 13/043* (2006.01)
*H01F 3/00* (2006.01)

(52) U.S. Cl. .............. 137/625.64; 335/279; 335/297

(58) Field of Classification Search ............. 137/625.64; 335/261, 279, 297
See application file for complete search history.

(56) References Cited

U.S. PATENT DOCUMENTS

| 2,898,936 | A | 8/1959 | Collins |
|---|---|---|---|
| 3,238,972 | A | 3/1966 | Bowman |
| 3,556,154 | A | 1/1971 | Kramer |
| 3,603,348 | A | 9/1971 | Wright |
| 3,774,641 | A | 11/1973 | Mindner et al. |
| 3,916,952 | A | 11/1975 | Pauliukonis |
| 3,921,660 | A | 11/1975 | Kowalski |
| 4,150,695 | A | 4/1979 | Kosugui |
| 4,245,671 | A | 1/1981 | Kosugui |
| 4,966,196 | A | 10/1990 | Meyer |
| 5,366,202 | A | 11/1994 | Lunzman |
| 5,640,987 | A | 6/1997 | Sturman |
| 6,105,616 | A | 8/2000 | Sturman et al. |
| 6,109,284 | A | 8/2000 | Johnson et al. |
| 6,325,102 | B1 | 12/2001 | Misumi et al. |
| 6,474,353 | B1 | 11/2002 | Sturman et al. |
| 6,739,293 | B2 | 5/2004 | Turner et al. |
| 6,814,103 | B2 | 11/2004 | Neuhaus et al. |
| 7,025,326 | B2 | 4/2006 | Lammert et al. |
| 7,111,614 | B1 | 9/2006 | Coldren et al. |
| 7,325,564 | B2 | 2/2008 | Ryuen et al. |
| 7,775,240 | B2 * | 8/2010 | Sturman ............. 137/625.64 |

FOREIGN PATENT DOCUMENTS

| GB | 2333142 | 7/1999 |
|---|---|---|
| WO | WO-03/058052 | 7/2003 |

* cited by examiner

*Primary Examiner* — John Rivell
(74) *Attorney, Agent, or Firm* — Blakely Sokoloff Taylor & Zafman LLP

(57) ABSTRACT

Two stage spool valves having, in a single assembly, a first stage spool and a second stage spool. The first stage spool may have a solenoid actuator with a return spring, with the second stage spool having either a hydraulic return or a spring return, or both. The solenoid actuator may be comprised of a stationary structure defining a magnetic flux path, including a stationary structure pole face, that together with a moveable structure, including a moveable structure pole face, define a substantially zero air gap magnetic circuit when the solenoid actuator is actuated, the pole faces of the stationary structure and the moveable structure each being defined in part by soft magnetic iron and in part by hardened steel, the hardened steel of the moveable structure contacting the hardened steel of the stationary structure and the soft magnetic iron of the moveable structure being face to face with the soft magnetic iron of the stationary structure when the solenoid actuator is actuated.

9 Claims, 3 Drawing Sheets

US 7,958,909 B2

SPOOL VALVE

CROSS-REFERENCE TO RELATED APPLICATION

This application is a continuation of U.S. patent application Ser. No. 11/703,303 filed Feb. 6, 2007 which claims the benefit of U.S. Provisional Patent Application No. 60/771,112 filed Feb. 7, 2006.

BACKGROUND OF THE INVENTION

1. Field of the Invention

The present invention relates to the field of solenoid actuated spool valves.

2. Prior Art

Solenoid actuated spool valves are well known in the prior art. Such valves include single solenoid spring return valves and double solenoid valves, either of which may or may not incorporate magnetic latching. An example of such valves may be found in U.S. Pat. No. 5,640,987. Also known are two-stage spool valve systems, the first stage being a solenoid valve that hydraulically controls a second stage spool valve. See for instance U.S. Pat. No. 6,739,293.

In certain applications, such as in fuel injectors and hydraulic valve actuation systems, solenoid actuated spool valves must have a useful life of billions of cycles. This requires that the wear of the various parts be held to a minimum, in turn requiring hardened steels, such as by way of example, 52100 or 440C. These materials, however, have a relatively low magnetic field saturation density in comparison to the saturation density of physically soft magnetic steels (iron), such as annealed 1020. These steels may have a saturation density of as much as twice the saturation density of the hardened steels, and since magnetic forces are proportional to the square of the flux density, may provide approximately four times the maximum actuation force provided by the hardened steels for the same pole area.

DETAILED DESCRIPTION OF THE PREFERRED EMBODIMENTS

Figure 1:
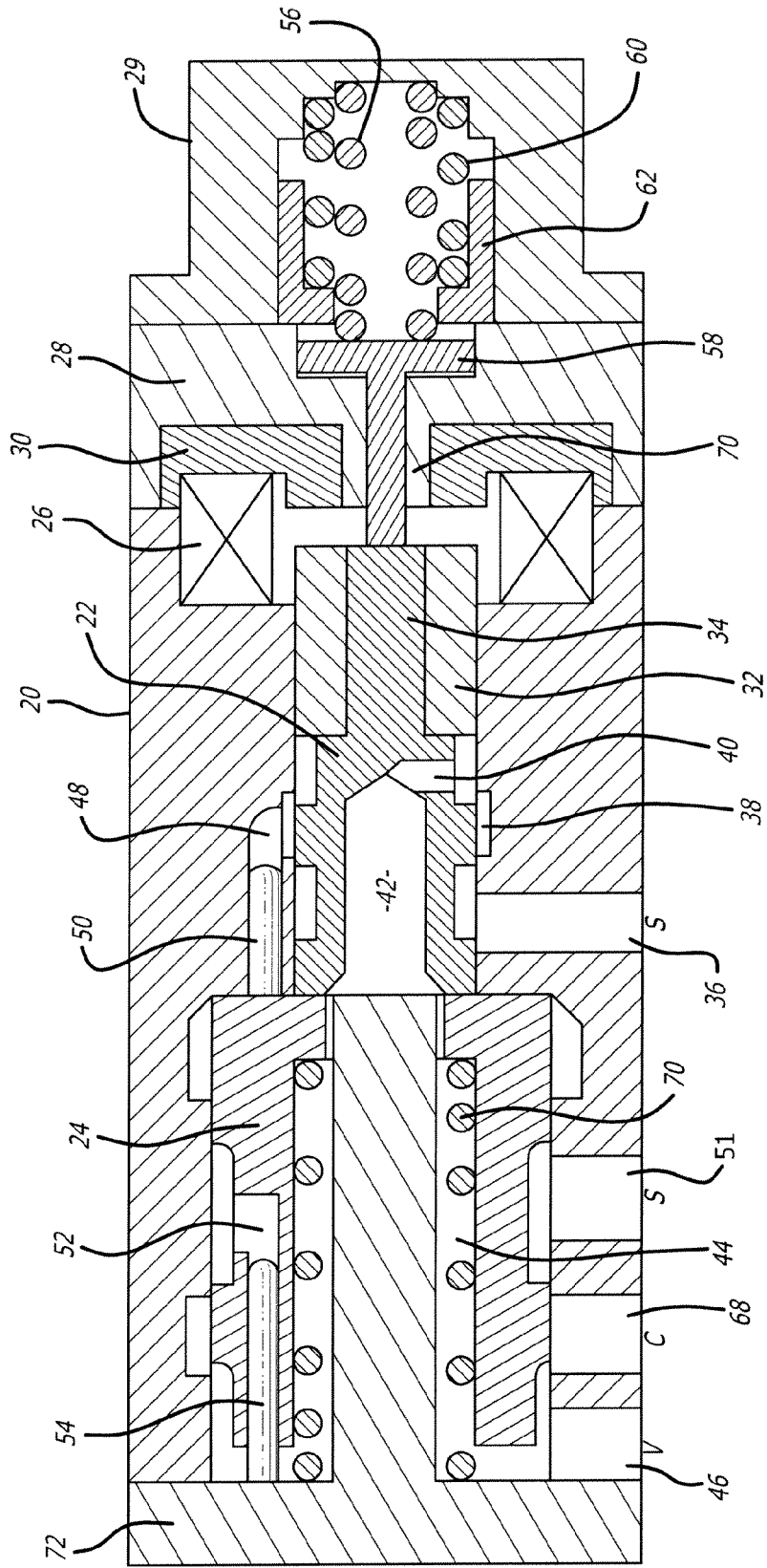
FIG. 1 is a cross section of a preferred embodiment of the present invention in the unactuated state.

First referring to FIG. 1, a cross-section of one embodiment of the present invention may be seen. This embodiment is a two-stage spool valve, the first stage being electromagnetically or solenoid actuated and the second stage being hydraulically actuated by the first stage. The first stage includes the combination of hardened steels for improved wear characteristics, and soft magnetic irons, for improved magnetic characteristics. The first stage also uses a single solenoid coil with a spring return, the spring return comprising two springs, one active over the entire return stroke and one active only over approximately one-half of the return stroke, to effectively provide a stepped spring return force of some fraction of the solenoid actuation force to provide fast action both on actuation and on return. The second stage uses a hydraulic return with the actuation of the first stage providing a hydraulic actuating force greater than the hydraulic return force, both forces being dependent on the pressure of a control fluid being supplied by a source of fluid under pressure.

As may be seen in FIG. 1, a body member 20 forms the body or housing for a pilot spool 22, as well as a second stage spool 24. At one end of the body member 20 is a solenoid coil 26, a pole piece 28 and a cover 29. Between the pole piece 28 and the body member 20 is an insert 30. Also on an extension 34 of the pilot spool 22 is another insert 32. Preferably insert 30 is press fitted into the pole piece 28 and insert 32 is press fitted onto an extension 34 on the pilot spool 22. In general, inserts 30 and 32 are fabricated of a high saturation density material such as annealed 1020 or high saturation density irons specifically intended for use in magnetically actuated devices. Also in general, the other parts of the two-stage valve shown in FIG. 1 are preferably hardened steel parts which, while having some magnetic characteristics, are chosen primarily for their wear resistance, such as 52100 or 440C. In that regard, insert 30 is assembled into pole piece 28 and insert 32 is assembled onto extension 34 of the pilot spool 22 before the end faces thereof are finished so that in the finished parts, the face of insert 30 is coplanar with the face of pole piece 28 and the face of insert 32 is coplanar with the face of the extension 34.

FIG. 1 represents the unactuated condition of the two-stage spool valve. In this condition, port 36, connected to a source S of fluid under pressure, is blocked by the land on the pilot spool 22. Any leakage into groove 38 in the body member 20 is coupled through passage 40 to the center region 42 of the pilot spool 22, and from there, into spring region 44 to the vent V port 46. Consequently, region 48 behind push pins 50 will be unpressurized. However, port 51, also coupled to source S of fluid under pressure, is coupled to region 52 behind push pins 54. This pressure forces the second stage spool 24 to its right-most position as shown in FIG. 1. At the same time, spring 56 pushes push member 58 to the left, forcing the pilot spool 22 to the left until the left end thereof abuts the corresponding face of the second stage spool 24. If desired, a separate stop could be provided for the leftmost motion of the pilot spool 22.

Figure 2:
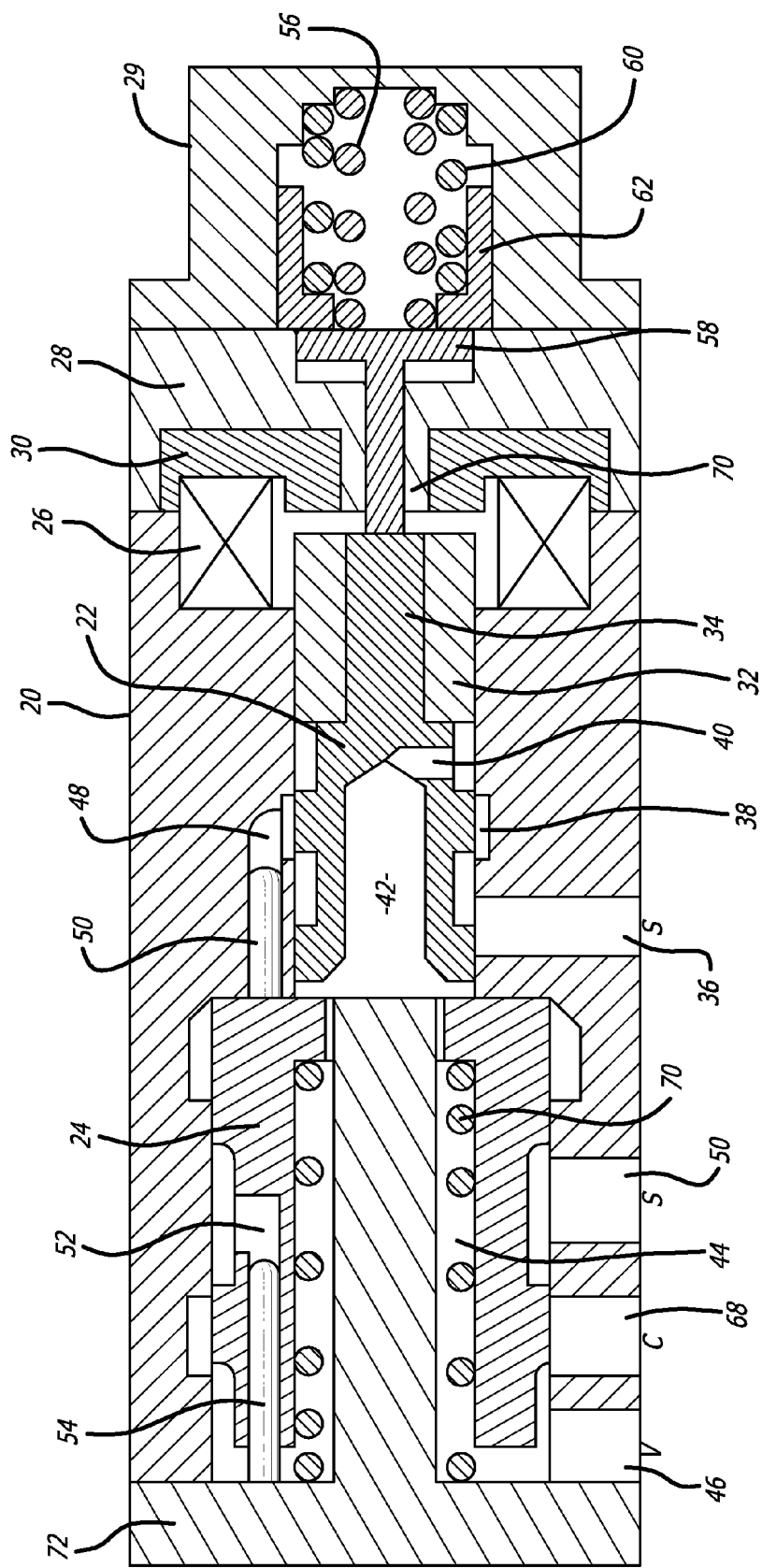
FIG. 2 is a cross section of the preferred embodiment of the two stage valve of FIG. 1 in the partially actuated state.

In the preferred embodiment, there are three push pins 50 and only two push pins 54, with all push pins being of the same diameter. Consequently, with push pins 54 being pressurized and push pins 50 not being pressurized, the assembly will seek the position shown in FIG. 1. However, when an actuating current is applied to the solenoid coil 26, the pilot spool 22, with the insert 32 thereon, will be magnetically attracted toward the right, initially being resisted only by spring 56 until push member 58 abuts member 62, as shown in FIG. 2. In the preferred embodiment this occurs at approximately the mid position of the pilot spool 22 where the source S of fluid under pressure coupled to port 36 begins to be coupled to region 48 behind push pins 50. With the air gap in the magnetic circuit being smaller than in FIG. 1, the total magnetic force on the pilot spool 22 will have typically increased. At the same time, further motion of the pilot spool 22 causes spring 60 to also start to compress as a result of push member 58 engaging member 62 and moving the same to the right against the force of spring 60. This, in essence, provides a step in the spring force, better approaching the typical shape of the magnetic force versus pilot spool position. This provides fast actuation, while also providing a boost force on deactivation to assure a fast return to the unactuated position.

Figure 3:
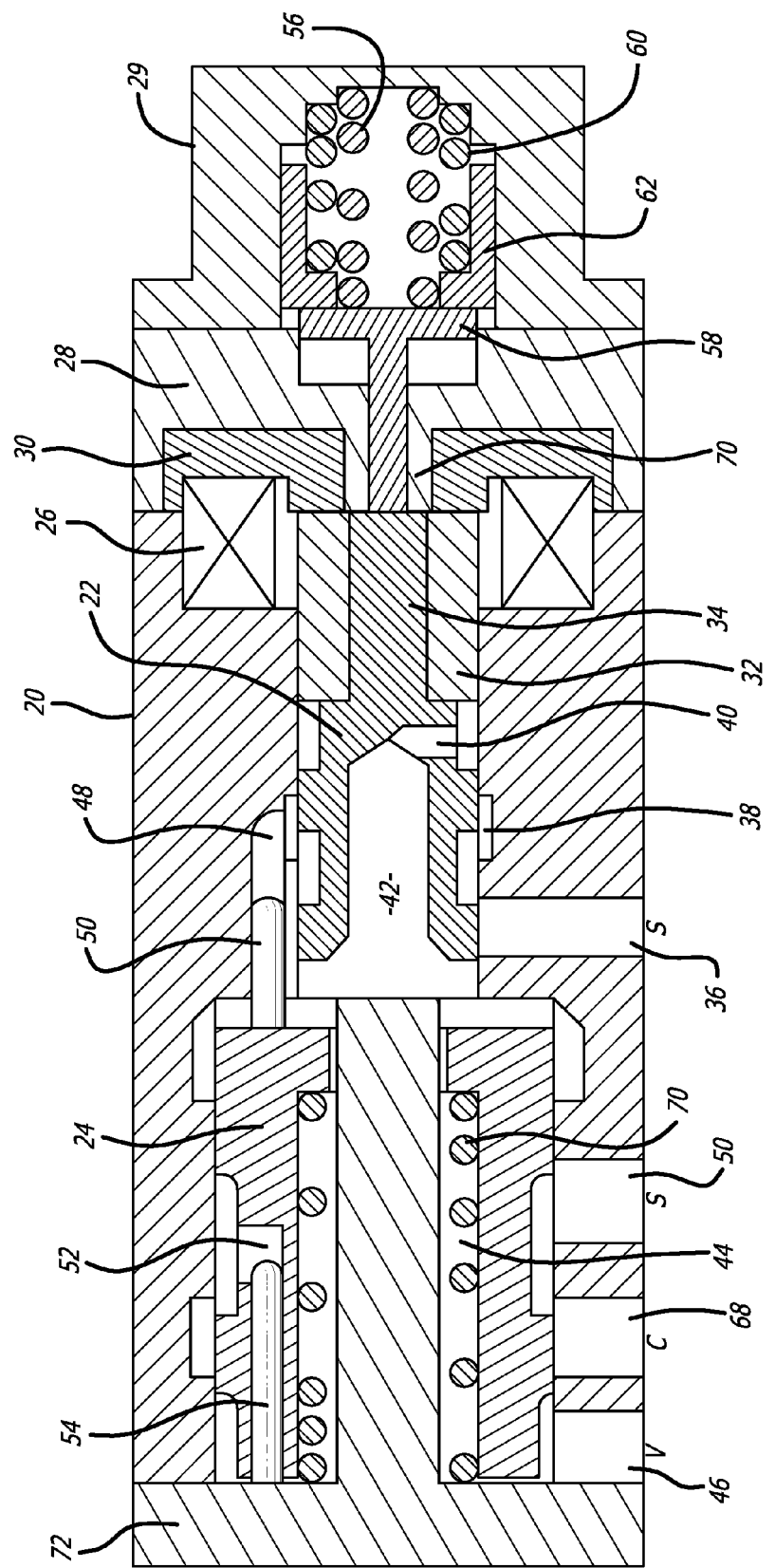
FIG. 3 is a cross section of the preferred embodiment of the two stage valve of FIG. 1 in the fully actuated state.

Finally, when the solenoid actuator is fully actuated as illustrated in FIG. 3, both springs 56 and 60, both of which were initially preloaded, have been further compressed, with the face of extension 34 on the pilot spool 22 and insert 32 resting against the adjacent face of pole piece 28 and insert 30. In this position, fluid is coupled from the source S through port 36 and annular passage 38 to the region 48 behind push pins 50, hydraulically forcing push pins 50 to the left. As stated before, in the preferred embodiment, push pins 50 and 54 are of the same diameter, though the second stage spool 24 only has two push pins 54, whereas the pilot spool 22 has three push pins 50. Accordingly, when region 48 behind push pins 50 is pressurized, the force pushing second stage spool 24 to the left is greater than the force encouraging second stage spool 24 to the right. In that regard, note that as the pressure of the source S of fluid under pressure increases, the actuating forces and return forces on the second stage spool 24 similarly increase. Also in that regard, spring 70, operative between end cap 72 and second stage spool 24, determines the position of the second stage spool when the pressure of the source S is not present, such as will occur when the pump or other fluid pressurizing means is off. In particular, that position would be the position shown in FIG. 1, wherein the second stage spool 24 couples the control port C 68 to vent port V 46, whereas when the solenoid is actuated as in FIG. 3, the source S of fluid under pressure in port 51 is coupled to control port C 68, with flow between control port C 68 and vent port V 46 being blocked. Thus the two-stage valve of this embodiment is a two-stage three-way valve coupling a control port to a source of fluid under pressure or to a vent, depending on the state of actuation of the solenoid actuator in the pilot valve.

As previously described, inserts 30 and 32 are high saturation density magnetic materials, chosen not primarily for their wear characteristics, but for their high saturation density. Wear on these materials is minimized by the fact that when the two-stage valve is actuated, the hardened extension 34 on the pilot spool 22 is stopped by portion 70 on the hardened steel pole piece 28. The high saturation density inserts 30 and 32, however, concentrate the flux to provide a high flux density between the two members in the actuated state of FIG. 3, providing both a high attraction force during actuation as well as a high holding force after actuation, provided the cross-section of the hardened steel members, such as pole piece 28 and body member 20, have sufficient cross-section to not saturate even at their lower saturation densities. Thus inserts 30 and 32, having approximately twice the saturation density of pole piece 28 and body member 20, allow the concentration of the same flux over approximately one-half the area. Since the magnetic force of attraction between inserts 30 and 32 is proportional to the square of the flux divided by the area, the use of inserts 30 and 32 may at least approximately double the actuation force of the solenoid actuator, allowing stronger springs for springs 56 and 60, thereby increasing both the actuation speed and the release speed of the two-stage valve. In that regard, the advantage of using a two-stage valve in many applications is the fact that larger flow porting between a control port and the source and vent ports may be obtained while still using a relatively small, low power solenoid actuator for the pilot spool. Also it should be noted that magnetic latching of the pilot spool in the actuated position can be used, if desired, primarily as a result of selection of the force of springs 56 and 60 and/or the presence or absence of a holding current in the solenoid coil 26. In that regard, if magnetic latching is not used, a full actuation current may be maintained in the solenoid coil 28 throughout each actuation period, or a full current pulse may be used for actuation purposes, followed by a substantially reduced holding current, which will maintain substantially the full magnetic field strength in the magnetic circuit because of the fact that, on actuation, the air gap in the magnetic circuit goes to a substantially zero gap. Also, while the present invention has been disclosed with respect to a three-way, two-stage valve, it will be obvious to those skilled in the art that simple changes may be made to provide some other type of valve, such as by way of example, a two-stage two-way valve.

In the illustrations presented herein, the assembly or manner of holding together of end cap 72, body member 20, pole piece 28 and cover 29 is not shown. The various parts may be joined in any manner, such as is known in the art, such as by way of example, by screws, by threaded parts, by placement in and closure of an outer housing, or by assembly and entrapment in the housing or body of a higher assembly.

The present invention as described herein has been described with respect to various unique features thereof. It is to be understood, however, that various subcombinations of the features described may also be advantageously incorporated in single or two-stage valves. Thus while certain embodiments of the present invention have been disclosed and described herein, it is to be understood that various changes in form and detail may be made therein without departing from the spirit and scope of the invention.

What is claimed is

1. A two stage spool valve comprising:
in a single assembly;
a first stage spool moveable between first and second positions, the first position coupling a source of fluid under pressure to a first hydraulic area associated with a second stage spool that is moveable between third and fourth positions, and the second position coupling the first hydraulic area to a vent, the second stage spool having an outer diameter defining a second stage spool cross sectional area;
the first hydraulic area being disposed so that fluid under pressure acting against the first hydraulic area encourages the second stage spool to the third position;
a second hydraulic area coupled to a source of fluid under pressure and disposed to encourage the second stage spool to the fourth position;
the first hydraulic area being larger than the second hydraulic area, the first and second hydraulic areas both being smaller than the second stage spool cross sectional area;
the second stage spool being configured to couple a first port to a second port when in one of the third and fourth positions and to not couple the first port to the second port when in the other of the third and fourth positions;
the first and second spools being cylindrical spools, each having at least one groove in its outer diameter cooperatively disposed with respect to at least one port in a respective housing in which the respective spool can slide to hydraulically communicate with and block hydraulic communication between the respective groove and port, depending on the position of the respective spool.

2. The two stage spool valve of claim 1 wherein the second stage spool couples the first port to a third port when in the other of the third and fourth positions.

3. The two stage spool valve of claim 1 further comprising a first return spring configured to encourage the second stage spool toward the fourth position.

4. The two stage spool valve of claim 1 further comprised of a solenoid actuator disposed to move the first stage spool to one of the first and second positions when actuated, and a return spring disposed to encourage the first stage spool to the other of the first and second positions.

5. The two stage spool valve of claim 4 wherein the solenoid actuator is comprised of a movable structure and a stationary structure, the stationary structure defining a magnetic flux path, including a stationary structure pole face, that together with the moveable structure, including a moveable structure pole face, define a substantially zero air gap magnetic circuit when the solenoid actuator is actuated, the pole faces of the stationary structure and the moveable structure each being defined in part by soft magnetic iron and in part by hardened steel, the hardened steel of the moveable structure contacting the hardened steel of the stationary structure and the soft magnetic iron of the moveable structure being face to face with the soft magnetic iron of the stationary structure when the solenoid actuator is actuated.

6. The two stage spool valve of claim 5 wherein a part of the magnetic path defined only by hardened steel has a larger cross sectional area than the part of the face to face area of the soft magnetic iron part of the pole faces when the solenoid is actuated to accommodate the lower saturation density of hardened steel in comparison with soft magnetic iron.

7. The two stage spool valve of claim 6 wherein the return spring for the first valve is comprised a combination of two springs, a first spring being active to encourage the first stage spool away from an actuated position to the opposite position throughout the first stage spool's motion between the first and the second positions, a second spring being active to encourage the first stage spool away from the actuated position toward the opposite position throughout approximately only one half first stage spool's motion from the actuated position toward the opposite position.

8. The two stage spool valve of claim 1 wherein the first stage spool and the second stage spool are coaxial.

9. The two stage spool valve of claim 1 wherein the first and second hydraulic areas are defined by cross sectional areas of a plurality of pins.

* * * * *